FIG. I.

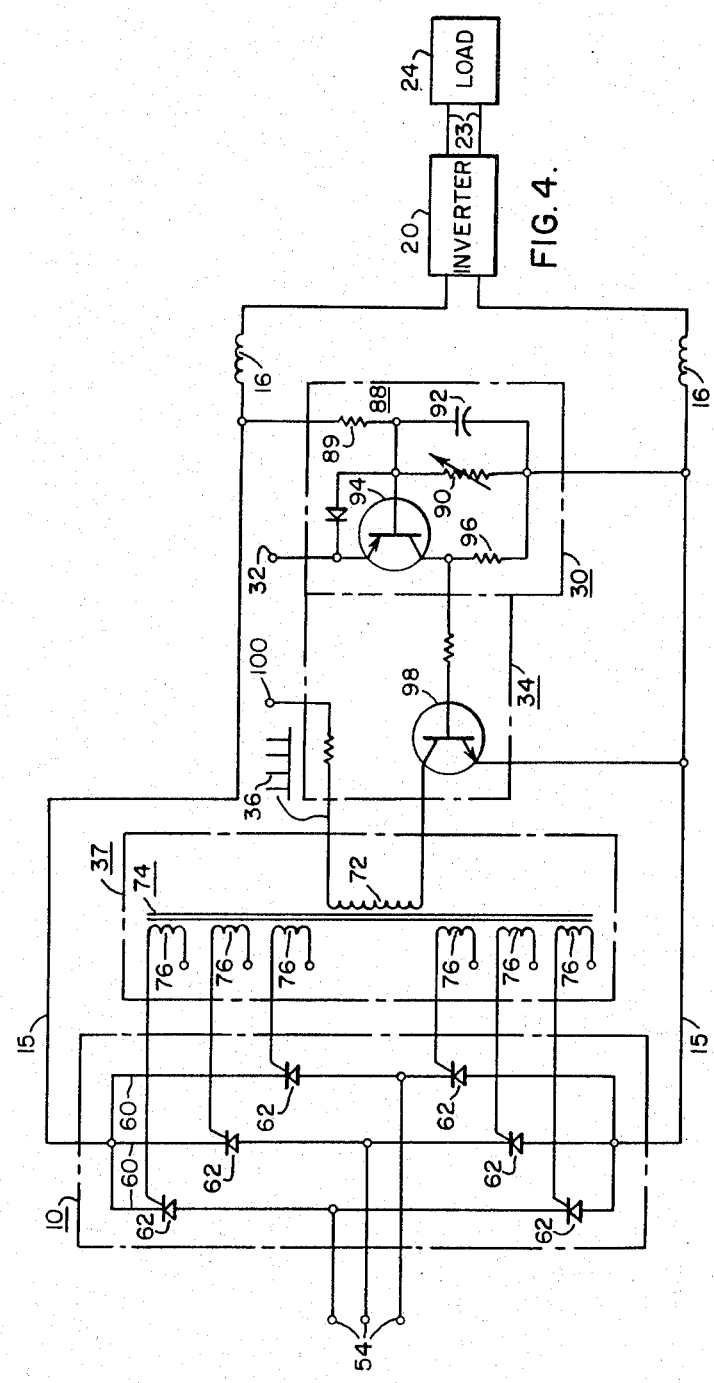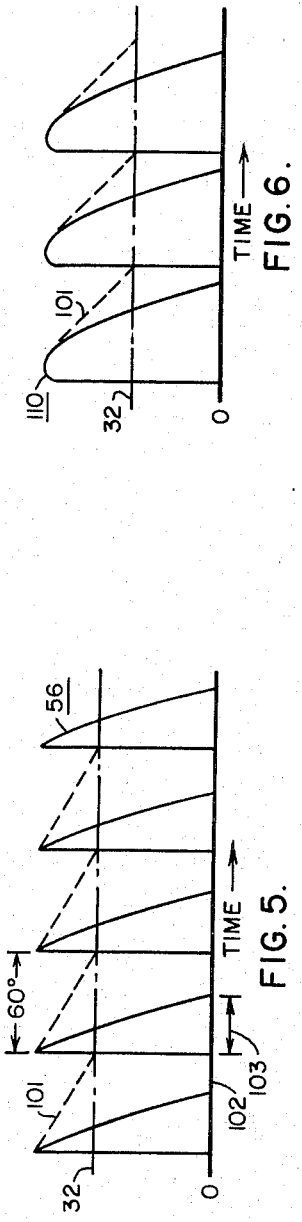

United States Patent Office 3,363,141
Patented Jan. 9, 1968

3,363,141
FIRING CIRCUIT FOR CONTROLLED SWITCHING DEVICES IN POWER SUPPLY CIRCUITS HAVING A PERIODIC OUTPUT
Brian R. Pelly, Murrysville, and Laban E. Lesster, Pittsburgh, Pa., assignors to Westinghouse Electric Corporation, Pittsburgh, Pa., a corporation of Pennsylvania
Filed Sept. 10, 1965, Ser. No. 486,283
12 Claims. (Cl. 315—200)

This invention relates in general to firing circuits and, more particularly, to firing circuits for power supplies having an adjustable output power level.

Heretofore, converter circuits have generally been driven by comparing a separately generated sawtooth or ramp type timing waveform with a reference potential. The ramp waveform was generally synchronized with the input AC source. A null circuit was used to detect each cycle when the ramp waveform voltage passed through the value of the reference potential, at which time a trigger pulse was provided to fire or turn on the switching elements in the converter. In order to adjust the output power, the conduction period (the duty cycle) of the switching elements was varied by varying the voltage of the reference potential. The phase of the conduction angle was shifted with respect to the input AC to control the amount of AC power which passed into the converter. In converters having a single phase input (or a three phase input with a limited output voltage range of full to one-half) only one ramp generator and one null circuit were required. In three phase systems having a maximum variation in output voltage (greater than full to one-half) a different circuit was employed. This circuit required pulse distribution circuits for applying separate trigger pulses to the switching elements for each input phase. This circuit required a separate ramp timing waveform generator and null circuit for each input phase. The components had to be matched and the circuits balanced for proper operation.

These prior art circuits required complex timing waveform generators which increased the cost and decreased the reliability of the converter. Further, the waveform generators generally contained points of high impedance which were subject to electrical interference. In the single phase, and three phase limited range application, the trigger pulses are not distributed but are applied simultaneously to all switching elements. This subjected the reversed biased switching elements to internal heat dissipation due to high leakage currents.

It is therefore an object of this invention to provide a trigger circuit for a power supply device that does not require a separate timing waveform or timing waveform generator, but is directly responsive to the periodic characteristic of the power supply output.

It is a further object of this invention to provide a simpler, less expensive, and more reliable triggering circuit for controlled switching devices in power supply circuits having a periodic output.

It is another object of this invention to provide a three-phase converter circuit having an output voltage range of greater than full to half which requires only a single trigger circuit thus eliminating the need for balanced ramp generators and null circuits with matched components.

It is an additional object of this invention to provide a trigger circuit for a converter circuit which has an inherently high signal to noise ratio and is therefore less susceptible to random noise pulses.

It is another object of this invention to provide a trigger circuit for a converter device which supplies the trigger pulses simultaneously to all switching elements therein without damaging the reversed biased switching elements.

Briefly, these and other objects which will become apparent as the description proceeds are achieved by providing a conventional variable duty cycle or controlled bridge circuit for converting a three-phase or single phase AC input into a pulsating DC. The bridge contains controlled current switching rectifying devices such as thyristors or SCR's serially connected between the load and the AC input power. An impedance is provided in the output circuit of the power supply for developing a ramp type timing voltage from the pulsating DC. A bistable comparing trigger circuit is provided which is responsive to the comparison of a reference potential and the timing voltage. In the present invention the pulsating D.C. provides the timing waveform of the trigger circuit and is not subject to electrical noises because of the low impedance of the AC input source. A distribution pulse transformer with many secondaries is used to apply the trigger pulses to the control terminals of all the current switching devices. The trigger pulses are removed from the switching devices as soon as the comparing-trigger circuit can sense the subsequent DC output pulse and no harm is done to the reversed biased switching devices. The duty cycle of the current switching devices is varied by varying the reference potential or by altering the components of the comparing-trigger circuit. Varying the duty cycle changes the power level of the pulsating direct current output. The bridge output does not have to be pulsating DC, but may be any waveform having a periodic characteristic such as phase controlled AC.

Further objects and advantages of the invention will become apparent and features of novelty which characterize the invention will be pointed out in particularity in the following detailed description.

For a better understanding of the invention reference may be had to the accompanying drawings wherein:

FIG. 4 shows a detailed schematic of a three phase embodiment of the present invention having a maximum adjustment range in the output power;

FIG. 5 shows the waveform of the pulsating DC of the FIG. 4 modification indicating in dotted lines the extension of the pulsating DC timing waveform due to a capacitor discharging; and FIG. 6 shows the fullwave rectified pulsating DC in a single phase embodiment of the FIG. 4 circuit indicating in dotted lines the extension of the timing waveform due to a capacitor discharging.

Figure 1:
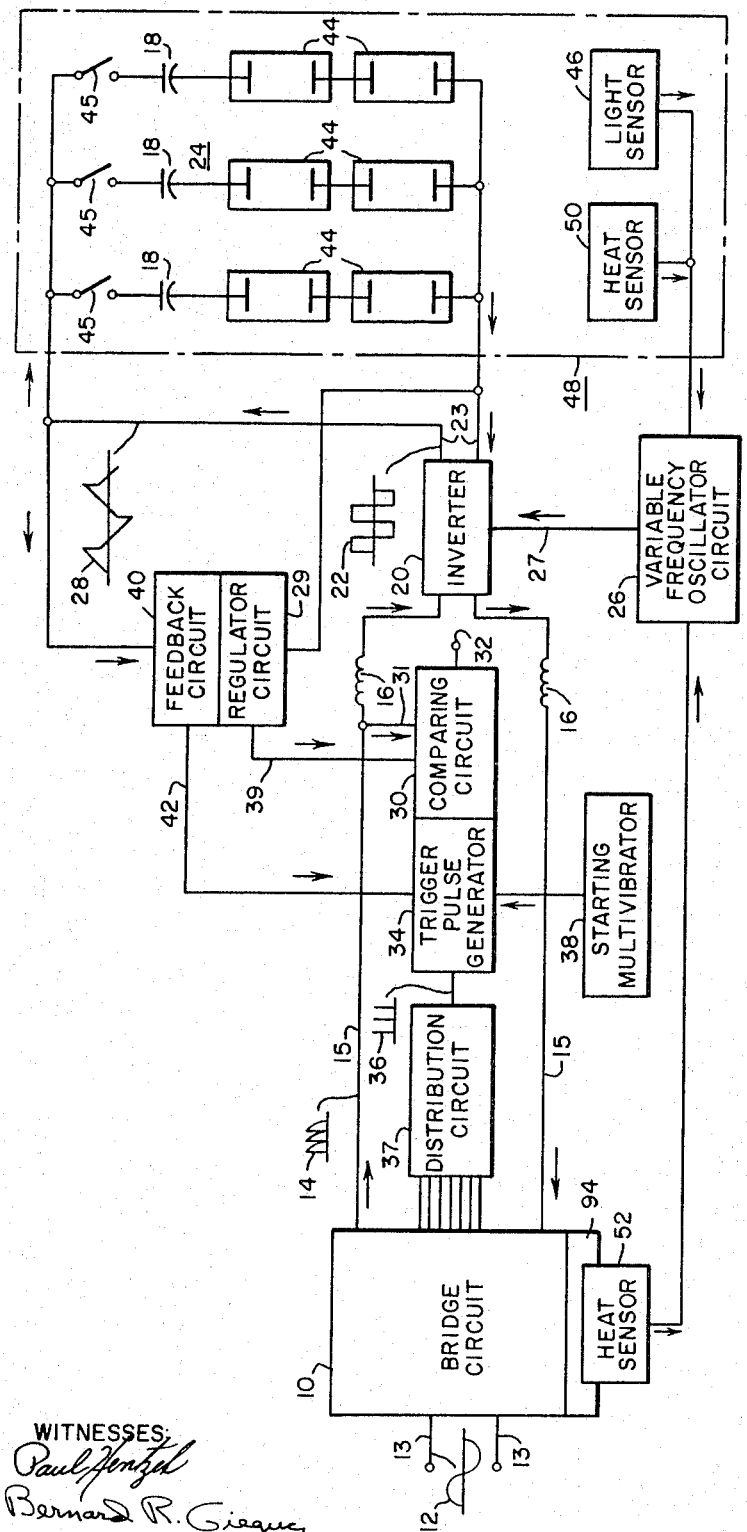
FIG. 1 shows a block diagram of a complete lighting system which employs the present invention.

Referring specifically to the figures, FIG. 1 shows a block diagram of a high-frequency lighting system which incorporates the invention. The waveforms appearing in the system are conveniently located on the diagram and identified with reference numerals. The flow of current and/or information is indicated by arrows adjacent to the circuit leads. A conventional variable duty cycle input rectifier bridge circuit 10 is shown which converts the single phase or three phase AC 12 at input 13 into phase controlled pulsating DC 14. The preferred bridge 10 provides full wave wave rectification, however a half wave rectifying bridge may be employed. The input switching elements employed in the bridge 10 are preferably thyristors (SCR's) because of the heavy currents that must be conducted and switched; however, other switching devices may be employed. The pulsating DC 14 is provided to the bridge output conductors 15 and is filtered by inductors 16 which are serially connected in conductors 15. An inverter 20 inverts the filtered DC into a high frequency, preferably square wave output current 22 which is applied across a lighting load 24 through inverter output conductors 23. The load 24 is comprised of gaseous discharge devices usch as fluorescent lamps 44 and serially connected ballast capacitors 18. The capacitive nature of the load 24 causes the square wave current 22 to appear as a sawtooth type voltage 28 across the load 24. The load capacitors 18 charge each half cycle to a peak voltage determined by a regulator circuit 29 which is connected across the inverter output conductors 23. The frequency of the square wave current 22 is controlled by a variable frequency oscillator 26 which is connected to the inverter 20. The frequency may be varied, for example, from 1 kc. to 4 kc. to establish the desired range of output current magnitude and lamp intensity.

In order to trigger the bridge 10 and vary the duty cycle thereof, the pulsating DC 14 therefrom is applied to a comparing circuit 30, which is connected to the bridge output lead 15 through a comparing circuit input lead 31. The comparing circuit 30 compares a voltage developed by the pulsating DC 14 to a reference potential 32. During each cycle, the developed voltage becomes equal to, and passes through, the value of the reference potential 32, and causes a trigger pulse generator 34 to provide a trigger pulse. This sequence of trigger pulses 36 which is synchronized with the input AC is applied to all of the input switching elements of the bridge 10 simultaneously through a distribution circuit 37. The power level of the DC 14 is adjusted by controlling the phase-displacement between the trigger pulses 36 and the input AC 12 by means of the comparing circuit 30 and trigger pulse generator 34. The usual method is to vary the value of the reference potential 32. The phase-displacement varies the duty cycle or condition angle of the bridge 10 input switching elements.

A starting multivibrator 38 is provided for initially starting the bridge 10. The multivibrator 38 is connected to the trigger pulse generator 34 and initiates the trigger pulse output. The normal trigger pulses 36 cannot be obtained until the bridge 10 has an output which affects the comparing circuit 30 and activates the trigger pulse generator 34.

A feedback circuit 40 is provided across the inverter 20 in parallel with the load 24 to protect the system against load short circuits. The feedback circuit 40 is responsive to the periodic characteristic of the voltage 28 developed across the load 24 by the square wave current 22. The feedback circuit 40 can eliminate the trigger pulse output 36 of pulse generator 34 through feedback path 42. In the event of a short circuit in the load 24, the feedback device 40 will not receive the periodic component and will prevent the bridge 10 from conducting current to the load 24 by removing the trigger pulses 36. For a more detailed description of this short circuit protection feature, reference should be had to copending application Ser. No. 486,285, filed concurrently herewith, by L. E. Lesster, entitled, "Excessive Current Protection Device," and assigned to the present assignee.

The light intensity of the fluorescent lamps 44 depends on the current level therethrough and is controlled by varying the frequency of the oscillator 26 which controls the frequency of the square wave current 22 as described in copending application Ser. No. 403,814, filed Oct. 14, 1965, by A. H. B. Walker, and assigned to the present assignee. The oscillator 26 is connected to the inverter 20 through oscillator output leads 27. A light sensor 46, connected to the variable frequency oscillator 26, is disposed in the region 48 which is illuminated by the lamps 44. The light sensor 46 detects changes in the ambient light level of the region, 48 and adjusts the frequency of the oscillator 26 to increase or decrease the lamp current and change the light intensity of the lamps 44 accordingly. Similarly, a region heat sensor 50 is connected to the oscillator 26 and disposed in the illuminated region 48. The heat sensor 50 regulates the temperature of the illuminated region 48. The sensors may be set for a desired light level or temperature by the people in the region 48. An additional heat sensor 52 is provided disposed in heat transfer relation with the input switching elements in the bridge 10. This bridge sensor 52 detects the operating temperature of the switching elements and prevents them from overheating. For a more detailed description of the sensors and their operation reference should be had to copending application Ser. No. 486,284, filed concurrently herewith, by L. E. Lesster and J. W. Wigert, entitled, "Light, Heat and Temperature Control System," and assigned to the present assignees.

Figure 2:
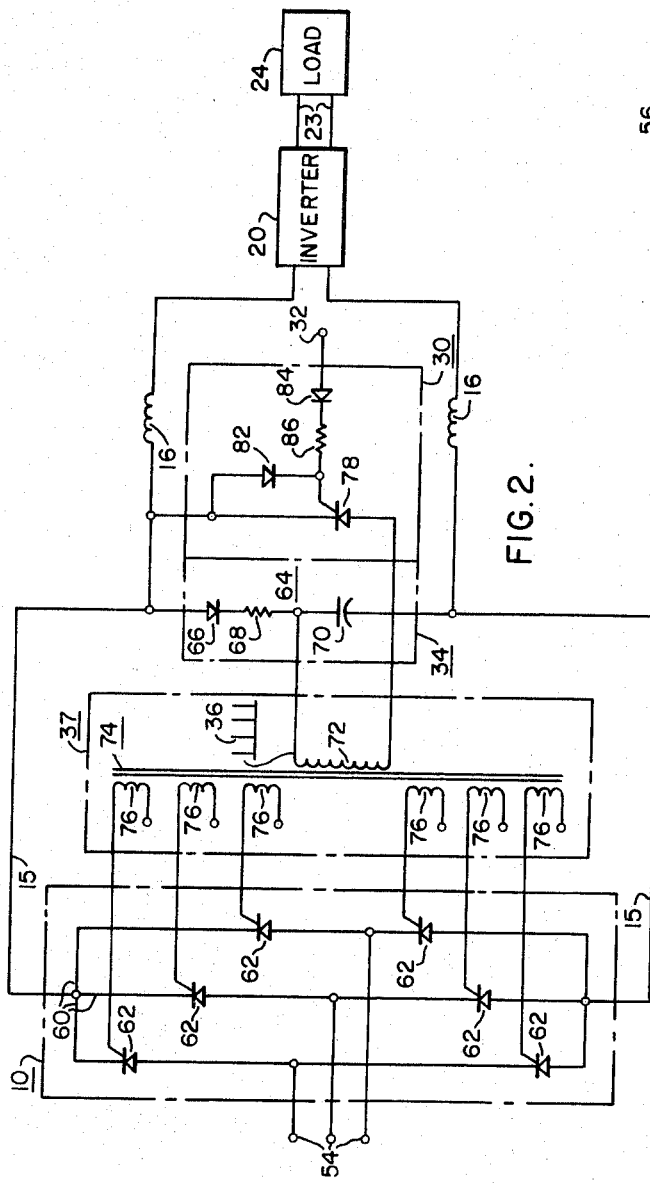
FIG. 2 shows a detailed schematic of a portion of the lighting system of FIG. 1 embodying a three phase application of the invention having a limited adjustment range in output power.
Figure 3:
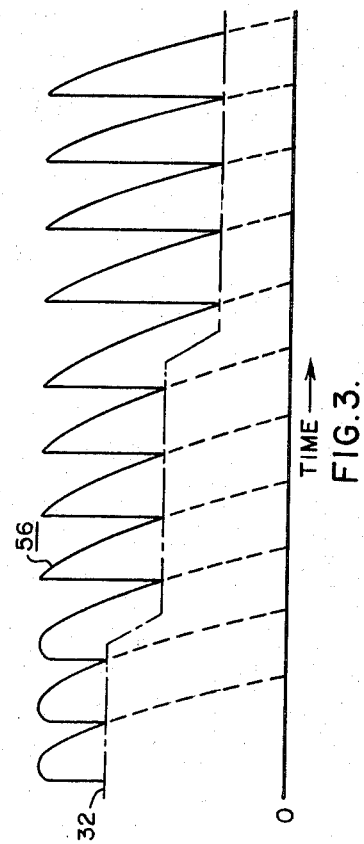
FIG. 3 shows a three phase rectified waveform of the pulsating DC timing waveform of the FIG. 2 modification indicating several output power levels.

FIG. 2 shows one embodiment of a novel triggering circuit for triggering a limited range converter which converts three phase AC from leads 54 into pulsating DC 56 in conductor 15 having an adjustable output voltage of from full to one-half. The pulsating DC 56 waveform is shown in FIG. 3. This embodiment employs a conventional three phase bridge 10 which is described briefly here. The bridge 10 has three legs 60 connected in parallel, the combination of which is connected in series with the load 24. Each leg 60 has two serially connected switching rectifying devices 62 such as thyristors. One lead of the three phase input leads 54 is connected to each leg 60 between the serially connected thyristors 62. The thyristors 62 in the top half of the bridge 10 complete the input path to the load and allow current to leave the bridge towards the load 24. The thyristors 62 in the bottom half of the bridge 58 complete the return path from the load and allow current to return from the load 24 into the bridge 58. The thyristors 62 are normally in the nonconductive high impedance state and oppose current flow therethrough, but can be switched to the conducting low impedance state by the combined effects of the trigger pulses 36 applied to the thyristors 62 and the forward biasing due to the AC input voltage from leads 54. Trigger pulses 36 are applied to all six of the thyristors 62 simultaneously at a frequency of six times the base frequency of the AC input 54. Only the two most forward biased thyristors 62 are turned on and permit current to conduct therethrough during the interval between trigger pulses 36. The conducting thyristors 62 are automatically turned off by line commutation when the corresponding phase of the AC applied at 54 passes through zero or by the successive firing of the next pair of thyristors 62. The thyristors alternately conduct so that one thyristor in the input path and one thyristor in the return path is always available to to provide a complete current path to and from the load.

It is well known in the art to replace the bottom three thyristors 62 with less expensive rectifying devices such as diodes. These diodes of course have no switching capability and cannot be used to vary the output voltage.

The comparing circuit 30 and trigger circuit 34 generate the trigger pulses 36 which switch the bridge thyristors 62. Trigger circuit 34 has a shunt portion 64 connected across the bridge 58 in parallel with the load 24. The shunt portion 64 has three components serially connected in the following order: a rectifying diode 66 which allows some of the pulsating DC 56 to flow into the shunt 64 but prevents the DC 56 from flowing out again; a current limiting resistor 68 which prevents the heavy pulsating DC 56 from harming the components of the comparing switching circuit 30; and a storage capacitor 70 which charges to the peak value of the pulsating DC 56 each cycle and supplied the energy for the trigger pulse 36 which initiates the next cycle. Connected in the discharge path of the capacitor 70 is the primary 72 of the pulse transformer 74. This transformer 74 has six secondaries 76 each one connected to one of the control terminals of the bridge thyristors 62.

The comparing circuit 30 has a bistable switching element 78 serially connected with the primary 72 in the discharge path. This switching element 78 may block or conduct the discharge current from the capacitor 70. The switching element 78 has two switching states; a high impedance or OFF switching state during which the capacitor 70 charges, and a low impedance or ON switching state during which the capacitor 70 discharges slightly and generates a trigger pulse 36 in transformer 74. The switching element 78 is preferably a thyristor as shown in FIG. 2. However, with appropriate circuit modifications, other switching devices may be used. The conductive state of the switching element 78 is determined by comparing the instantaneous voltage of the pulsating DC 56 (which is applied to the cathode thereof), to a reference potential 32 (which is applied to the control terminal thereof). Applied to the anode terminal is the peak value of the pulsating DC 56 which is stored in capacitor 70. When the instantaneous value of the DC 56 is low enough to allow the reference potential 32 to turn the switching element 78 ON, the capacitor 70 partially discharges therethrough and a trigger pulse 36 is generated in the transformer 74 and applied to the control terminals of the bridge thyristors 62. Two of the thyristors 62 are turned on and the next pulse of the pulsating DC 56 is provided. This next pulse turns off the switching element 78 by applying a reverse bias to the cathode thereof. The peak value of this next pulse is greater than the voltage in capacitor 70 which is applied to the control terminal. The trigger pulses 36 are removed from the bridge thyristors 62. The trigger pulses 36 are very brief and do not incur any harm to the reversed biased bridge thyristors 62. Note that the trigger pulses 36 are not removed from the bridge 58 until the next DC pulse 56 has arrived at the switching element 78. The trigger pulses 36 will be as long as is required to trigger the thyristors 62.

A base resistor 86 limits the current into the control terminal of switching element 78. Diode 82 prevents reverse biasing of the control terminal-cathode junction when the cathode is forced positive with respect to the reference potential 32 by the pulsating DC 56. Diode 84 prevents the pulsating DC 56 from affecting the reference potential 32.

The operation of the comparing switching circuit 30 and trigger circuit 34 in the limited range embodiment shown in FIG. 2 is accomplished in the following steps.

(1) Providing the reference potential 32 preferably from an electronic DC supply, but which may be provided by a battery or the like.

(2) Storing nearly the peak value of the pulsating DC 56 (or a voltage developed by the pulsating DC 56) in the capacitor 70. Once the pulsating DC 56 has passed through its cyclic peak value, the capacitor voltage cannot decrease because the diode 66 prevents the capacitor from discharging back through the load 24.

(3) Comparing the instaneous value of the pulsating DC 56 to the reference potential 32 and to the stored voltage by means of the switching element 78 as described above.

(4) Switching ON the switching element 78 when the three voltages compare in a predetermined ratio corresponding to the ratio which is sufficient to turn ON the switching element 78.

(5) Providing a trigger pulse 36 by discharging the capacitor 70 through the transformer primary 72 and the switching element 78 while it is turned on with the energy of the pulse coming from the charge stored in the capacitor 70.

(6) Applying the trigger pulse 36 to the control terminal of the bridge thyristors 62 by means of the pulse transformer 74.

(7) Removing the trigger pulse 36 by switching off the switching element 78 with the pulsating DC 56.

(8) Adjusting the power level of the pulsating DC 56. The duty cycle of the bridge thyristors is varied by varying the reference potential 32 or by varying the components of the comparing circuit 30.

FIG. 3 shows the pulsating DC 56 at three different power output levels. The length of the duty cycle or conduction period remains at 60° in each level. The position or phase of the 60° angle in each level is displaced with respect to the AC input 54 causing the amount of electrical power included under the waveform of the pulsating DC 56 to vary. The output voltage may thus be adjusted over a range of approximately 2:1.

As a specific embodiment of the FIG. 2 embodiment the following is a list of preferred components and voltages.

| | |
|---|---|
| Bridge thyristors 62 | W809S (Westinghouse). |
| Diode 66 | IN547. |
| Resistor 68 | 100 ohms. |
| Capacitor 70 | 10 microfarads. |
| Transformer 74 | 2:1:1:1:1:1:1 stop down. |
| Switching element | 2N1777. |
| Diode 82 | IN645. |
| Resistor 84 | 100 ohms. |
| Diode 86 | IN645. |
| AC input 54 | 208 volts 3 phase c.p.s. |
| Voltage range of DC 56 when filtered | Approximately 150–300 volts DC. |
| Reference potential | 0–300 volts DC. |
| Maximum output current | Approximately 70 amps. |

FIG. 4 shows an embodiment of the invention which provides a maximum power output range of from full output voltage to zero output voltage. The FIG. 2 reference numerals are used to indicate similar items found in FIG. 4. This modification has a voltage dividing network 88 comprising two serially connected resistors 89 and 90. The resistor 89 has a fixed value and is used to lower the voltage which is applied to the comparing circuit 30 and the trigger circuit 34. In this embodiment these circuits are not subjected to full pulsating DC 56 voltage. The resistor 90 is variable and has capacitor 92 connected in parallel thereacross. The capacitor 92 charges to the peak value of the pulsating DC 56 divided by the voltage divider ratio. The capacitor discharges through the variable resistor 90 and provides a decreasing voltage at the control terminal of comparing switching transistor 94. A reference potential 32 is applied to the emitter terminal of the comparing transistor 94 and is compared with the decreasing capacitor voltage. In the first embodiment the pulsating DC 56 was used as the timing waveform. In this embodiment the pulsating DC 56 is extended by a capacitor and then used as the timing waveform. When the capacitor 92 is discharged enough to allow the comparing transistor 94 to conduct, a voltage is developed across resistor 96 which is serially connected to the comparing transistor 94. The voltage thus developed turns on trigger switching transistor 98 which is serially connected to the primary 72 of transformer 74. The other side of the primary is connected to a DC supply 100 which supplies the current for the trigger pulse 36. Current passes through the primary 72 and the trigger transistor 98 generating a trigger pulse 36 which is applied to the control terminals of the bridge thyristors 62 by secondaries 76. The trigger pulse 36 is removed as soon as the comparing circuit 30 detects the next pulse of pulsating DC 56. Comparing transistor 94 and trigger transistor 98 may of course be any suitable type of switching device.

The operation of the maximum range embodiment is accomplished in the following steps.

(1) Storing in the capacitor 92 the voltage developed across the variable resistor 90 by the pulsating DC 56.

(2) Allowing the stored charge to discharge at a predetermined rate through the variable resistor 90. The diminishing stored voltage keeping comparing transistor 94 nonconducting.

(3) Comparing the diminishing stored voltage to the reference potential 32.

(4) Switching the comparing transistor 94 ON when the comparison is in a predetermined ratio. The switching turns on the trigger transistor 98.

(5) Providing a trigger pulse with current from DC supply 100 which flows through the serial combination of the primary 72 and the now conducting trigger transistor 98.

(6) Applying the trigger pulses 36 to the control terminals of all of the bridge SCRs 62 by means of the secondaries 76 of transformer 74.

(7) Removing the trigger pulses 36 when the comparing circuit 30 detects the next pulses from the bridge 58.

(8) Adjusting the value of the reference potential 32, or adjusting the value of variable resistor 90, to vary the point in time at which the trigger pulse is provided by varying the point in time at which the comparing transistor 94 is turned ON.

In the maximum range embodiment shown in FIG. 4 the discharging capacitor 92 provides the timing waveform. In the limited range embodiment shown in FIG. 2 the pulsating DC 56 provides the timing waveform. FIG. 5 shows the pulsating DC 56 with the extended decay voltage of capacitor 92 shown in dotted lines 101. The trigger pulses 36 are provided when the dotted discharge line 101 intersects the reference potential line 32 also shown on FIG. 5. The dead space 102 between the DC pulses 56 indicates that the thyristors 62 are turning off automatically by line commutation, and that the conduction period indicated by numeral 103 is less than 60°. The time which each cycle of the pulsating DC 56 starts, is preferably varied by adjusting variable resistor 90, however, it is possible to accomplish the same result by varying the reference potential 32. Resistor 90 controls the discharge rate of capacitor 92 and displaces the discharge curve 101 to intersect the reference at different points. The power level of the pulsating DC 56 can thus be adjusted to any value between zero and full converter power. Accordingly, the duty cycle can be varied over a 120° range.

The maximum range embodiment requires only one trigger circuit for all three phases just as the limited range embodiment because all of the bridge thyristors 62 are connected to the same transformer. The prior art device for varying the phase more than 60° required separate circuitry for each phase, which is not required by the present invention.

The maximum range embodiment shown in FIG. 4 may be converted to a limited range converter by removing the capacitor 92. The pulsating DC 56 would be the timing waveform as described in the limited range embodiment shown in FIG. 2.

The maximum range embodiment can be modified to convert single phase AC instead of three phase AC. FIG. 6 shows the pulsating DC 110 which results from full-wave rectification of single phase AC. The dotted lines 101 indicate the capacitor discharge which delays the beginning of the next output pulse. To obtain the full adjustment range in the power level of the pulsating DC 110, the starting time of the pulses of the pulsating DC 110 must be variable over a range of 180°.

A low voltage slave bridge may be connected in parallel with the bridge 10 for providing low voltage pulsating DC to the comparing circuit 30. In this manner the circuit 30 does not have to handle the full load voltage. In this case the trigger circuit 34 triggers both the bridge 10 and the slave bridge.

It will be apparent to those skilled in the art that the objects of this invention have been achieved by providing a converter firing circuit which is responsive to the converter output and therefore does not require a separate ramp generating circuit. A maximum range (greater than 60° phase control) three phase or single phase converter has been provided by employing the voltage extending properties of a charged capacitor. The three phase inverter does not require separate ramp generating and null circuits for each phase as were required by the prior art. Eliminating this circuitry as described above has reduced the cost and improved the reliability of the present converter. The low impedance of the source has substantially eliminated noise interference to the firing circuit.

The features of each modification of this invention may be employed with other modifications. For example, the voltage dividing network 88 of the FIG. 4 modification may be used to supply the comparing circuit 30 of the three phase modification of FIG. 2. The feature of providing a charged capacitor 70 to provide the trigger pulse as described in the FIG. 2 modification may also be used in the FIG. 4 modification.

Although this invention has been described with respect to a particular embodiment thereof, it is not to be so limited as changes and modifications may be made therein which are within the intended scope of the invention.

What is claimed is:

1. A power supply circuit adapted to be connected to an input AC source for converting the input AC therefrom into a periodic output current having an adjustable power level adapted to be applied to a load, said power supply circuit comprising in combination:

current switching means connected between the AC source and the load, and having a duty cycle comprising a low impedance state operable to pass current therethrough to the load and a high impedance state operable to oppose current flow therethrough, the duty cycle being variable to control the power level of the periodic output current;

impedance means responsive to the periodic output current for developing a periodic voltage having at least in part a ramp-like waveshape;

means for providing a reference potential;

comparing switching means for comparing the ramp-like portion of the periodic voltage to said reference potential, said comparing means having two switching states responsive to said comparison which are periodically and alternately established therein due to the periodic output current;

trigger pulse generating means responsive to the switching state of said comparing means for providing a periodic sequence of trigger pulses to said current switching means which in conjunction with the input AC periodically and alternately establish the low and the high impedance states in said current switching means, the sequence of trigger pulses being synchronized with the input AC and phase displaced therefrom;

means for varying the phase displacement between the sequence of trigger pulses and the input AC for controlling duty cycle of said current switching means to adjust the power level of the periodic output current; and means for providing starting pulses which initiate the switching of the impedance states of said current switching means.

2. The power supply circuit as specified in claim 1, wherein said comparing means is responsive to the terminal portion of each period of the periodic output current to switch switching states and cause said trigger pulse generating means to switch said current switching means and initiate the next period of the periodic output current, said comparing means further responsive to the initial portion of each period of the periodic output current to switch states and cause said trigger pulse generating means to remove the trigger pulse from said current switching means whereby the trigger pulses remain applied to said current switching means only as long as required for the switching thereof.

3. The power supply circuit as specified in claim 1, wherein the phase displacement between the sequence of trigger pulses and the input AC is adjusted by varying said reference potential.

4. The power supply as specified in claim 1, wherein a pulse transformer is provided between said trigger generating means and said currents switching means for applying the sequence of trigger pulses to said current switching means.

5. The power supply as specified in claim 1, wherein said trigger pulse generating means includes an energy storing element which at least partially discharges to provide the energy required for each pulse of the sequence of trigger pulses, said energy storing element being recharged by the periodic output current during each period thereof.

6. The power supply as specified in claim 5, wherein said energy storing element is a capacitor connected across the output of said power supply having a charge path connected thereto through which the periodic output current charges said capacitor and a discharge path connected thereto through which said capacitor at least partially discharges to form each pulse of the sequence of trigger pulses, and wherein a rectifying diode is serially connected in said charge path to prevent said capacitor from discharging through said charge path each period when the periodic current decreases in magnitude, and wherein a pulse transformer is provided having a primary winding serially connected in said discharge path and at least one secondary connected to said current switching means for applying the trigger pulses thereto, the continuity of said discharge path being controlled by said comparing switching means to control the discharging of said capacitor.

7. The power supply as specified in claim 1, wherein a voltage dividing network is connected across the output of the power supply to provide the periodic voltage developed by the periodic output current, the periodic voltage being lower than the voltage developed across the entire voltage dividing network by the periodic output current.

8. The power supply as specified in claim 7, wherein a capacitor is connected across a portion of said voltage dividing network, said capacitor being charged by the periodic output current through said voltage dividing network and discharging to provide a ramp-like waveform for comparison to said reference potential.

9. The power supply circuit as specified in claim 1, wherein the input AC is three phase and said current switching means is a three phase bridge circuit having three legs connected in parallel one associated with each phase of the three phase AC input, each of said legs having current switching means and rectifying means serially connected therein, each leg connected in series with the load, each of said current switching means having a low impedance state effective to conduct current to the load which may be established therein by a trigger pulse when the current switching means is forward biased by the AC input associated therewith, each of said current switching means having a high impedance state effective to prevent the conduction of current therethrough, said bridge providing a pulsating DC across said parallel legs in synchronization with the AC input.

10. The power supply circuit as specified in claim 9, wherein a filter means is provided for filtering the pulsating DC periodic output current.

11. The power supply circuit as specified in claim 10, wherein an inverter circuit is provided for inverting the filtered output current into an alternating current having a square waveform.

12. The combination as specified in claim 11 and further including a gaseous discharge load device connected to said inverter and operable on the square wave current therefrom.

References Cited

UNITED STATES PATENTS

| | | | |
|---|---|---|---|
| 2,965,804 | 12/1960 | Roesel et al. | 321—201 |
| 3,109,976 | 11/1963 | Sichling | 321—4 |
| 3,152,296 | 10/1964 | Meszaros | 321—5 |

FOREIGN PATENTS

| | | |
|---|---|---|
| 1,325,853 | 3/1963 | France. |

JOHN F. COUCH, *Primary Examiner.*

W. H. BEHA, *Assistant Examiner.*